Figures 1, 2:
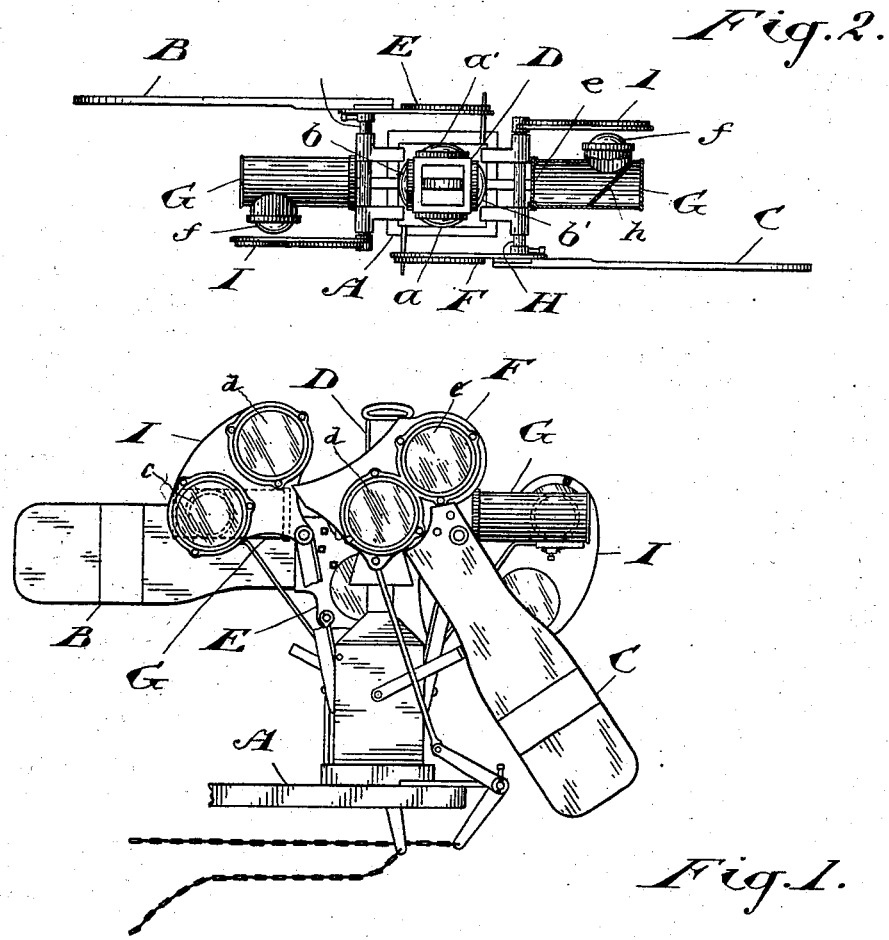

No. 698,317. Patented Apr. 22, 1902.
H. L. PIPER.
TRAIN ORDER SIGNAL.
(Application filed Nov. 29, 1901.)
(No Model.)

Witnesses
A. J. Colbourne
F. E. Webster

Inventor
Hiram L. Piper
by Ridout & Maybee
Attorneys

UNITED STATES PATENT OFFICE.

HIRAM L. PIPER, OF TORONTO, CANADA.

TRAIN-ORDER SIGNAL.

SPECIFICATION forming part of Letters Patent No. 698,317, dated April 22, 1902.

Application filed November 29, 1901. Serial No. 84,123. (No model.)

*To all whom it may concern:*

Be it known that I, HIRAM L. PIPER, of the city of Toronto, in the county of York, Province of Ontario, Canada, have invented certain new and useful Improvements in Train-Order Signals, of which the following is a specification.

The object of my invention is to devise an order-signal which will enable an engineer at night to determine from either side of the signal whether his line is clear or blocked and, further, to give such signals for trains going in either direction; and it consists, essentially, of an order-signal provided with the usual pivoted signal-arm, a lamp showing a light in the direction from which a train is moving, spectacles moving with the signal-arm to show red or green in front of the lamp, according to the position of the signal-arm, means for showing a supplemental light in the direction in which the train is moving, and supplemental spectacles moving with the signal-arm and adapted to show the same color or any other color of proper significance in front of the supplemental light as is shown in front of the main light. To make the order-signal answer for trains going in either direction requires a duplication of the parts described.

My invention further relates to the means employed for obtaining the supplemental light or lights used with the supplemental spectacles.

Figure 1 is a front elevation of my improved two-direction order-signal. Fig. 2 is a plan view of the same.

In the drawings like letters of reference indicate corresponding parts in the different figures.

A represents the frame of the order-signal, of any suitable construction. Upon this frame are pivoted the signal-arms B and C. Centrally located on the frame is a lamp D, which when the apparatus is designed to signal trains moving in opposite directions is provided with four lenses, two of them *a a'* showing along the track in opposite directions and two of them *b b'* showing laterally at right angles to the track.

The signal-arms B and C are provided, respectively, with spectacles E F so connected to the signal-arms that they may be moved in front of the lamp to give signals corresponding to the position of the signal-arm. Such spectacles are now commonly used and are generally provided with one red and one green glass. In the drawings red glasses in the spectacles are lettered *c* and green glasses *d*.

The arrangement of the signal-arms and spectacles just described is old and well known; but at night such a construction is only capable of giving a signal visible when it is viewed from the side of the order-signal facing the direction from which a train is moving. This means that if an engineer at night has passed the order-signal before he has stopped his train he cannot tell by looking back when the order-signal has been changed to show the line as clear. It is to obviate this difficulty that I provide the lamp with the side lenses *b b'*. Opposite each side lens is located a tube G, preferably closed at its outer end and provided at its inner end with a pane of glass *e*, which will exclude snow and dirt and at the same time permit the light from the lamp to enter the tube. Each tube is provided with a lens *f* in its side pointing in the opposite direction to the main light on the other side of the order-signal. Within each tube is located a mirror *h*, adapted to direct the rays from the lamp entering the tube into the lens.

The pivot of each signal-arm is formed by a spindle H, suitably journaled on the frame of the order-signal. On the opposite end of each spindle from the signal-arm is secured a supplemntal spectacle I, provided, like the main spectacle, with a red glass *c* and a green glass *d* or any other desired colors. Each of these spectacles is secured to the spindle in such a way that when the main spectacle shows a red or green glass in front of the lamp the supplemental spectacle shows a glass of corresponding color in front of the supplemental light emitted from the tube in the opposite direction. By this arrangement any signal shown from the main light toward the direction from which the train is moving is simultaneously shown by the supplemental light in the direction toward which the train is moving, so that the engineer can tell from either side of the order-signal whether his line is clear or blocked.

The supplemental lights shown being smaller and less intense than the main signal-lights are not likely to confuse the engineer, as he will be thus easily able to distinguish which is the signal intended for his train and which is merely the supplemental signal intended for a train coming in the opposite direction. In addition the position of the lights in relation to the track serves to differentiate them.

It should be noted that the colors used for the main signals are not necessarily red and green, but may be of any color chosen for the purpose; nor is it essential that the supplemental spectacles show the same colors as the main, as such colors may be used as may be agreed on as giving the same signal.

An important advantage derived from the use of only one lamp in the apparatus is this, that if the lamp goes out all signals at once disappear. If two or more lamps were used, the failure of one might leave signals showing which conveyed false orders to the engineer.

What I claim as my invention is—

1. In a train-order signal, a movable signal-arm, a lamp showing in the direction from which a train is moving, and spectacles connected with the signal-arm so that they move in front of the lamp in accordance with the position of the signal-arm, in combination with a supplemental light showing in the opposite direction to and out of line with the main light; and supplemental spectacles also movable with the signal-arm to display the same signal in front of the supplemental light as is shown in front of the main light, substantially as described.

2. In a train-order signal, a movable signal-arm, a lamp showing in the direction from which a train is moving and also laterally, and spectacles connected with the signal-arm so that they move in front of the lamp in accordance with the position of the signal-arm, in combination with means for receiving the light from the side of the lamp and throwing it in the direction in which the train is moving, and supplemental spectacles movable with the signal-arm to cause the light thrown in the direction of the train's motion to display the same signal as is shown by the light showing in the other direction, substantially as described.

3. In a train-order signal, a movable signal-arm, a lamp showing in the direction from which a train is moving and also laterally, and spectacles connected with the signal-arm so that they move in front of the lamp in accordance with the position of the signal-arm; a laterally-extending tube adapted to receive the light thrown laterally from the lamp; a mirror within the tube adapted to turn the light in the direction in which the train is moving; a lens to form the light into a suitable beam; and supplemental spectacles movable with the signal-arm to cause the light thrown in the direction of the train's motion to display the same signal as is shown by the light showing in the other direction, substantially as described.

4. In a train-order signal, two movable signal-arms governing trains moving in opposite directions; a lamp adapted to show light in each direction and also to each side; and spectacles connected to the signal-arms so that they move in front of the lamp in accordance with the positions of the signal-arms, in combination with means for receiving the light from the sides of the lamp and directing it respectively in opposite directions; and supplemental spectacles movable with the signal-arms so that the light from the side of the lamp thrown in the direction of motion of any given train may be caused to display the same signal as is shown by the main light in the opposite direction, substantially as described.

Toronto, November 22, 1901.

HIRAM L. PIPER.

In presence of—
 JOHN G. RIDOUT,
 J. M. WEBSTER.